United States Patent
Sung

[19]

[11] Patent Number: 6,088,366
[45] Date of Patent: Jul. 11, 2000

[54] DEVICE AND METHOD FOR CONVERTING A DATA TRANSFER RATE IN COMMUNICATION OF DIGITAL AUDIO AND VIDEO DATA

[75] Inventor: Kwan-soo Sung, Seoul, Rep. of Korea

[73] Assignee: Samsung Electronic Co., Ltd., Kyungki-Do, Rep. of Korea

[21] Appl. No.: 08/766,460

[22] Filed: Dec. 12, 1996

[30] Foreign Application Priority Data

Sep. 6, 1996 [KR] Rep. of Korea ....................... 96-38700

[51] Int. Cl.$^7$ ....................................... H04J 3/14
[52] U.S. Cl. ...................... 370/468; 370/252; 370/394; 370/514; 348/423
[58] Field of Search ...................................... 370/389, 394, 370/402, 403, 405, 468, 517, 232, 252, 471, 473, 474, 528, 505, 506; 348/423, 464, 467

[56] References Cited

U.S. PATENT DOCUMENTS

| | | | |
|---|---|---|---|
| 5,282,201 | 1/1994 | Frank et al. | 370/403 |
| 5,504,757 | 4/1996 | Cook et al. | 370/468 |
| 5,606,562 | 2/1997 | Landguth | 370/506 |
| 5,612,956 | 3/1997 | Walker et al. | 370/506 |
| 5,682,384 | 10/1997 | Zarros | 370/394 |
| 5,822,327 | 10/1998 | Satou | 370/505 |

*Primary Examiner*—Douglas W. Olms
*Assistant Examiner*—Shick Hom
*Attorney, Agent, or Firm*—Sughrue, Mion, Zinn, Macpeak & Seas, PLLC

[57] ABSTRACT

An object of the invention is to provide data transmission which satisfies specifications for SD-format digital interface in a transmission device using an isochronous transmission mode such as IEEE 1394 digital data transmission and reception. To achieve this object, the device for converting the data transfer rate in communication of digital audio and/or video data comprises a timing simulator and a transmission timing controller. The timing simulator receives some signals and mode signals to generate transmission basis signals for transmitting a stream of the source packets and outputs the transmission basis signals. The transmission timing controller receives the transmission basis signals and transmits packets at every cycle sync, according to fixed rules. The device for converting a data transfer rate in communication of digital audio and video data can overcome the different data transfer rates of the inner bus of the digital device (camcorder) and IEEE 1394 bus, thereby the device can satisfy the specifications for SD-format digital interface.

18 Claims, 6 Drawing Sheets

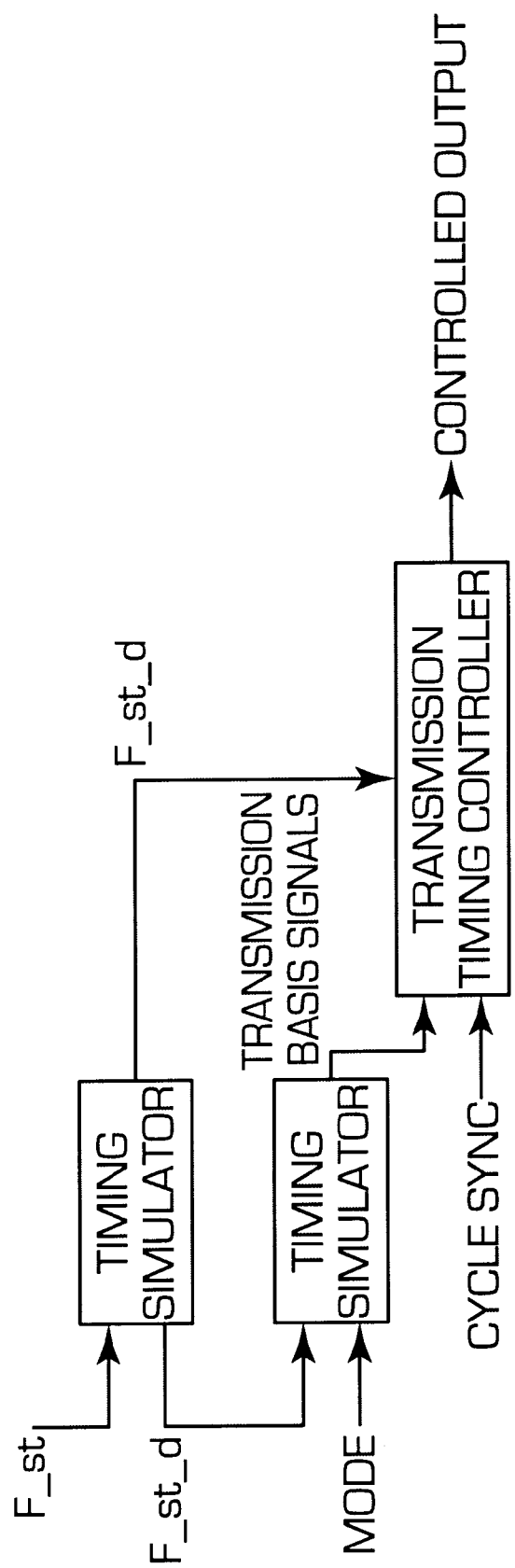

DEVICE AND METHOD FOR CONVERTING A DATA TRANSFER RATE IN COMMUNICATION OF DIGITAL AUDIO AND VIDEO DATA

BACKGROUND OF THE INVENTION

This invention relates to a communication device for transmitting digital and audio and video data in an isochronous communication mode. More specifically, when digital audio and video data according to a standard definition (SD) is transmitted to another digital data device, the invention controls the locations where empty packets are inserted to transmit information between devices using a uniform transfer rate.

DESCRIPTION OF THE PRIOR ART

Development of computer technology in recent years introduced a digital multimedia era by linking computers with electronic home appliances. The computer technology allowing development of digital multimedia growth comprises (a) improved technology of various digital multimedia equipment such as digital video cassette recorders (VCR) and digital camcorders and (b) interface technology which enables the multimedia equipment to be linked with each other. One of the most well-known interfaces is the IEEE 1394 interface. The IEEE 1394 interface is a standard bus interface definition conventionally used to network personal computers, portable computers and other digital systems which operate independently.

FIG. 1 is a block diagram of a multimedia system for data-communication with a digital camcorder using the IEEE 1394 interface. The multimedia system comprises (1) a camera 11 for recording real world images and generating audio and/or video signals, (2) a signal processor 12 for processing the signals and producing audio and/or video information, (3) an error correcting code means (ECC) 13 for appending error correcting code to the audio and/or video information, (4) a deck 14 for storing the information, (5) an interface 15 for interfacing the system 10 with another multimedia system 20 to provide mutual communication and (6) a communicating means 17, which may be implemented by IEEE 1394 for performing digital communication between the multimedia systems 10 and 20. The data communication between the components of the multimedia system 10 are performed through inner bus 16.

When a frame is transmitted on the inner bus during a bus interval, the inner bus exhibits a high transfer rate at specific parts of the interval and stays idle during other parts to provide efficient audio and video data transmission within the device. The characteristics of the bus system are well known to those skilled in this art.

FIG. 2 shows a model of transmission of a stream of source packets from one digital device to another. A source packet may be split into 1, 2, 4 or 8 data blocks, and zero or more data blocks are contained in an IEEE 1394 isochronous packet. A receiver of the packet collects the data blocks in the isochronous packet and combine them to reconstruct the source packet for delivery to the application.

The source packets should be modified to comply with both the specification and the definitions for IEEE 1394 and DVC DIF (digital video cassette digital interface) to allow transmission from one digital device (e.g., a digital camcorder 10 shown in FIG. 1) to another digital device (e.g., a multimedia device 20 shown in FIG. 1). These IEEE 1394 and SD specifications and definitions are commonly known by those skilled in this art, thus only a few brief comments should suffice before describing the operation of the present invention.

[Definition 1] Data transmission according to Standard Definition-Video Cassette Recorder Digital InterFace (SD-VCR DIF) should be applied with the following time conditions.

① Start timing information of one frame should be transmitted to the receiver. The start timing information is carried in a CIP header in the source packet of the frame as time stamp information. The CIP header is placed at the beginning of the data field of an IEEE 1394 isochronous packet and contains information on the type of the real time data contained in the data field following the CIP header.

② The data block n of a video frame M should be transmitted in a packet which meets the following conditions. (n=0 . . . K−1)

Packet_arrival_time_L $\leq T_n$ $T_n$—Transmission_delay_limit $\leq$ Packet_arrival_time_F where $T_n$ is the nominal timing for data block n, $T_n = T_M - (T_{M+1} - T_M) * n/K$ Packet_arrival_time_L: The cycle time when the last bit of the packet which includes data block n arrives in the receiver.

Packet_arrival_time_F: The cycle time when the first bit of the packet which includes data block n arrives in the receiver.

$T_M$ is the time stamp for video frame M.

Transmission_delay_limit=450 $\mu s$

K is the number of source packets in a video frame.

For example,

K=250 (525-60 system)

K=300 (625-50 system)

The time conditions for frame transmission are generally described above. More detailed specifications are described in the Digital Interface and the CIP Header in the Blue Book of SD-VCR, published in December 1995.

From the above definition, it is noted that the 250 or 300 source packets should be uniformly distributed in a fixed margin to allow transmission between digital data devices.

[Definition 2] Isochronous transmission of IEEE 1394 operates by transmitting isochronous packets, responding to a cycle sync every 125 $\mu s$ as shown in FIG. 3. Detailed specifications on the IEEE 1394 are described in the Standard published in 1995.

FIG. 4 shows the state of the inner bus 16 during transmission of one frame of data. As set forth above, the inner bus of the digital camcorder 10 usually has a high transfer rate at only specific parts in the frame.

The following observations are derived from the above definitions.

In the case of the 525-60 system (i.e., National Television System Committee: NTSC), the number of source packets is 250 per frame and the number of cycle syncs per frame is approximately 266.9. As a result, in the 525-60 system, empty packets without data should be allocated to 16 or 17 isochronous cycles in order to transmit image information of a frame through the IEEE 1394 bus. Accordingly, the timing of the inner bus of the digital camcorder should be synchronized with the output timing through the IEEE 1394 bus. The empty packet insertion is to be determined to conform with [Definition 1, ②].

In order to synchronize the transfer rate of the inner bus of digital devices (e.g., a camcorder) and the transfer rate of IEEE 1394 bus under [Definition 1, ②], the steps of buffering transmission data using a memory, for example, and controlling the output timing of the transmission data from the memory are required.

SUMMARY OF THE INVENTION

An object of the present invention is to provide transmission in accordance with definitions of the SD-format digital interface in communication devices with an isochronous communication mode like the digital data transmission and reception definitions of IEEE 1394.

To achieve this object, the device for converting a data transfer rate in communication of digital audio and video data comprises a timing simulator and a transmission timing controller. The timing simulator receives data signals and a mode signal to generate transmission basis signals for transmitting streams of source packets and outputs the transmission basis signals. The transmission timing controller receives the transmission basis signals and transmits packets at every cycle sync according to fixed rules.

The method for converting a data transfer rate in communication of digital audio and video data includes the steps of (1) receiving data signals and a mode signal to generate transmission basis signals for transmitting streams of source packets and (2) using the transmission basis signals to transmit packets at every cycle sync according to fixed rules. The fixed rules specify packet transmission timing of source packet for a cycle sync such that when a cycle sync occurs in a transmission basis signal interval, a packet with source packet data is transmitted at the cycle sync and when two cycle syncs occur in a transmission basis signal interval, a packet with source packet data is transmitted at only one of the two cycle syncs and an empty packet without data is transmitted at the other cycle sync.

The features and objects of the present invention will be apparent from the following description of a preferred embodiment thereof and from the accompanying drawings.

BRIEF DESCRIPTION OF THE DRAWINGS

FIG. 8 is a block diagram of the device for converting a data transfer rate according to another embodiment of the present invention.

DETAILED DESCRIPTION OF THE PREFERRED EMBODIMENTS

Figure 1:
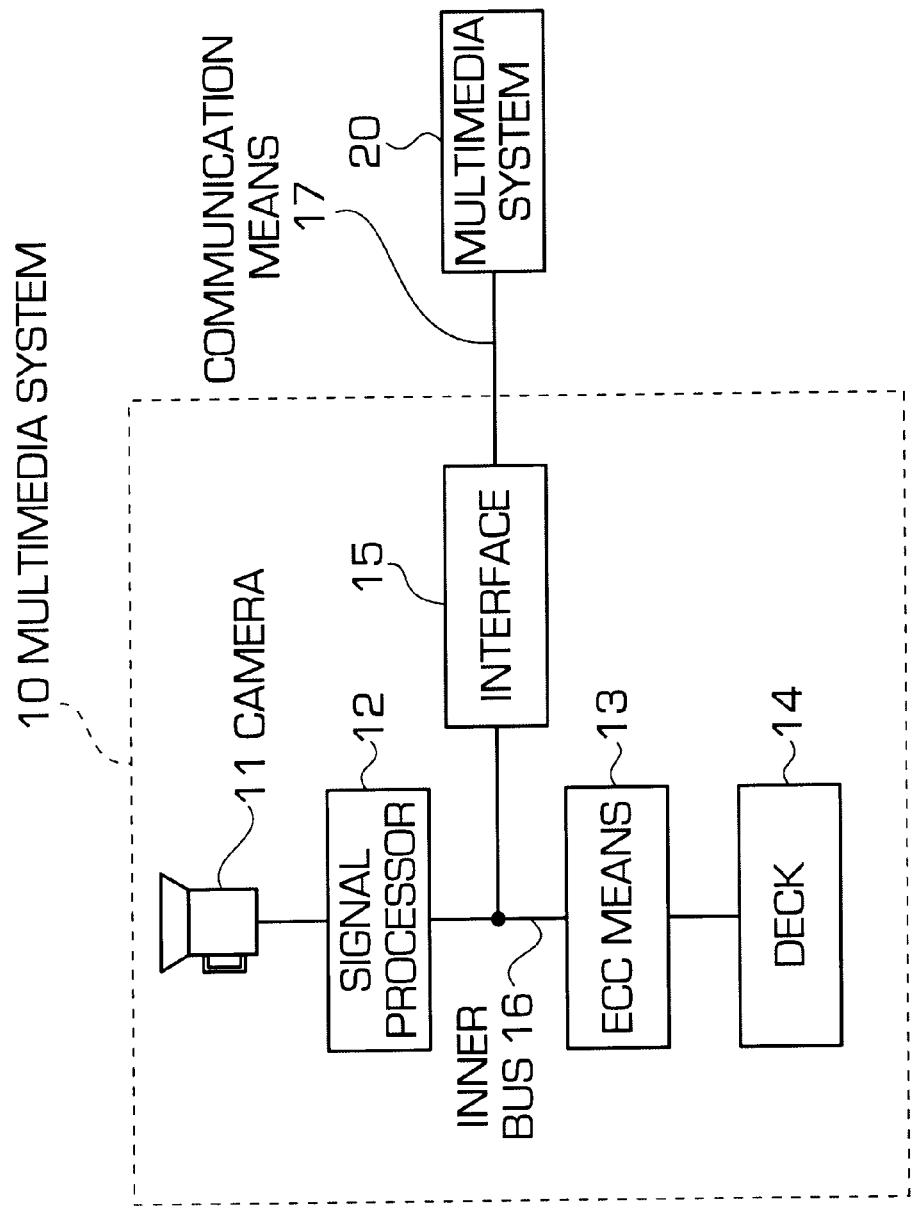
FIG. 1 is a block diagram of a multimedia system for data-communication with a common digital camcorder through an IEEE 1394 interface.
Figure 2:
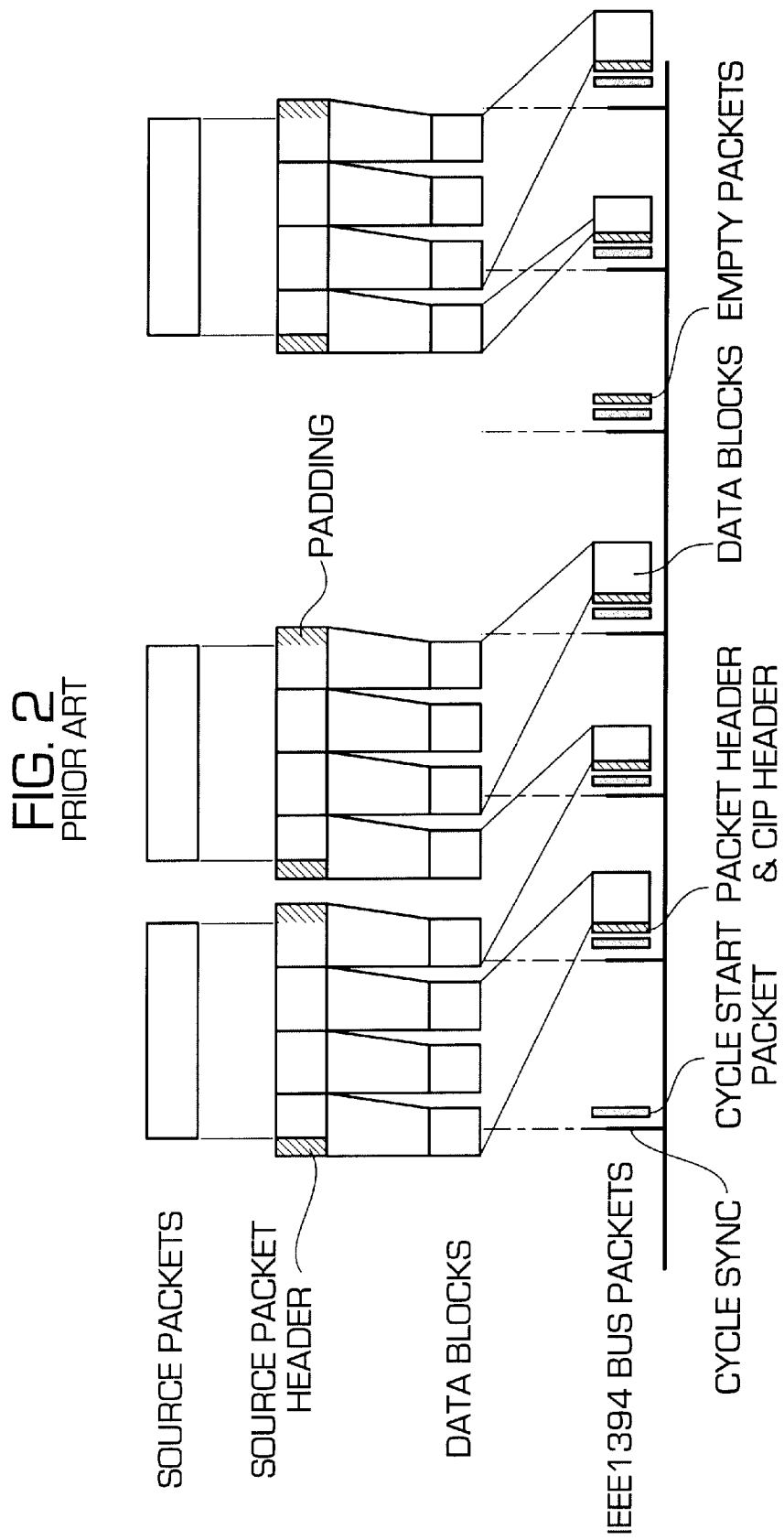
FIG. 2 is a model of the transmission scheme for communicating a stream of source packets from one digital device to another digital device.
Figure 3:
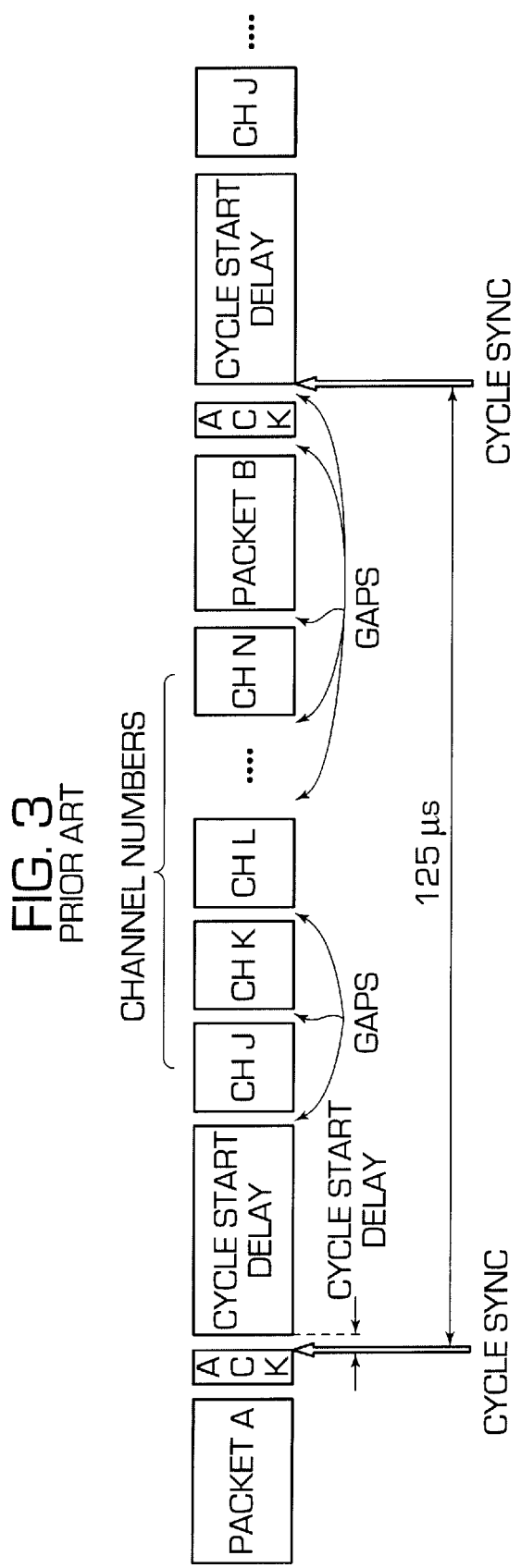
FIG. 3 is a timing chart of a cycle structure according to IEEE 1394.
Figure 4:
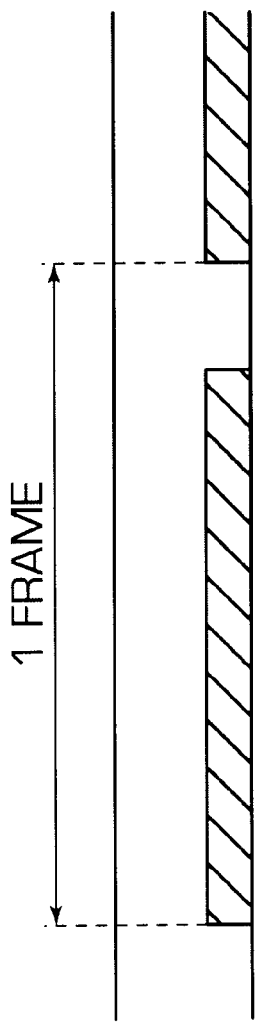
FIG. 4 is a timing chart of the state of the inner bus of a digital device during transmission of the data in one frame.
Figure 5:
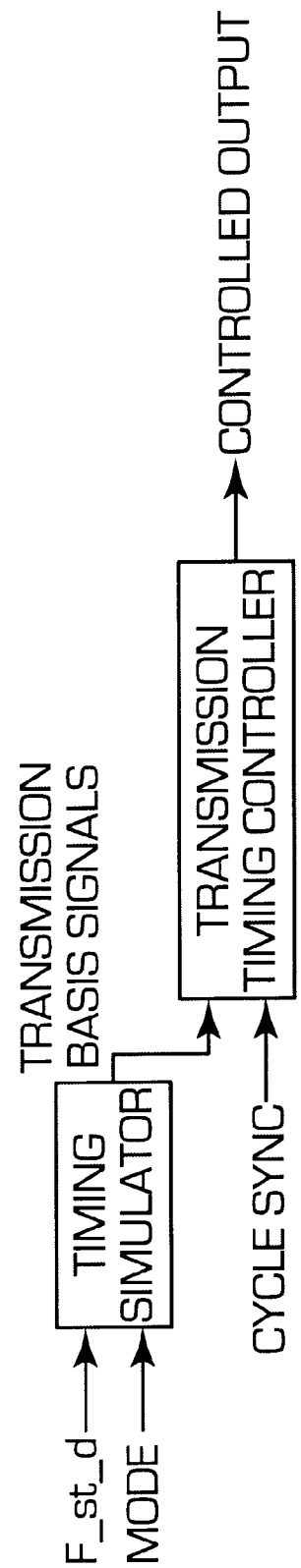
FIG. 5 is a block diagram of the device for converting data transfer rate in communication of digital audio and/or video data according to the present invention.

Referring to FIG. 5, the invention comprises a timing simulator and a transmission timing controller. The timing simulator receives a F__st__d signal which delays a F__st signal, corresponding to the beginning of the transmission of the first data in a frame in the inner bus of a camcorder, for example, for a predetermined length of time. The simulator also receives mode signals indicating whether the data is in NTSC mode or in PAL mode. The timing simulator then outputs transmission basis signals according to the F__st__d signals and the mode signals. The transmission timing controller receives the transmission basis signals and transmits packets at every cycle sync of a transmission specification, such that when a cycle sync occurs in a transmission basis signal interval, a packet with source packet data is transmitted at the cycle sync and when two cycle syncs occur in a transmission basis signal interval, a packet with source packet data is transmitted at only one of the two cycle syncs and an empty packet without data is transmitted at the other cycle sync. The invention thus aligns source packet data transmission with sync cycles for transmitting the source packet from a digital device though a communication medium in an isochronous mode.

Figure 6:
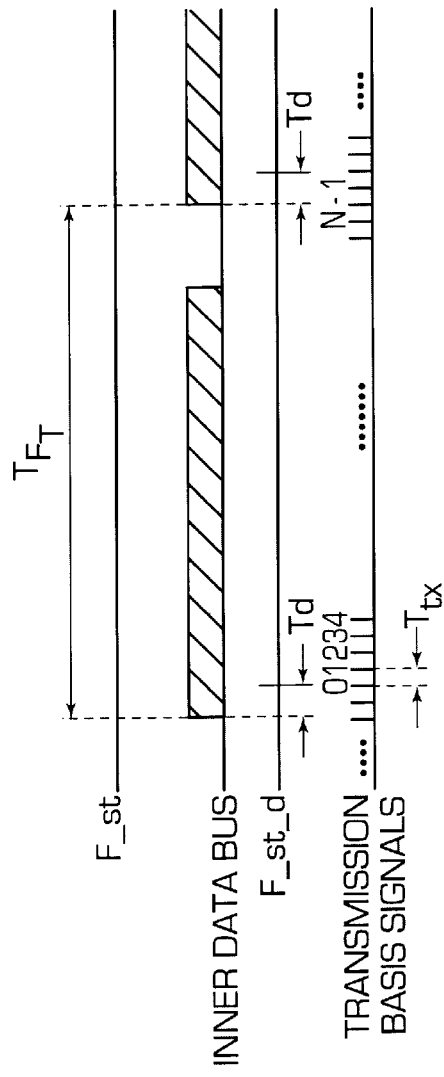
FIG. 6 is a timing chart of operation of the timing simulator.

Referring to FIG. 6, the timing simulator outputs transmission basis signals at every Ttx interval according to the signal mode (NTSC mode or PAL mode). Ttx represents a time fragment of a frame divided into 250 or 300 source packets. Td in FIG. 6 suggests a time delay for filling a memory with transmission data to buffer the transmission data. Operators may determine the length of this delay, which may be used for buffering the data in a memory. FIG. 8 illustrates this embodiment.

Figure 7:
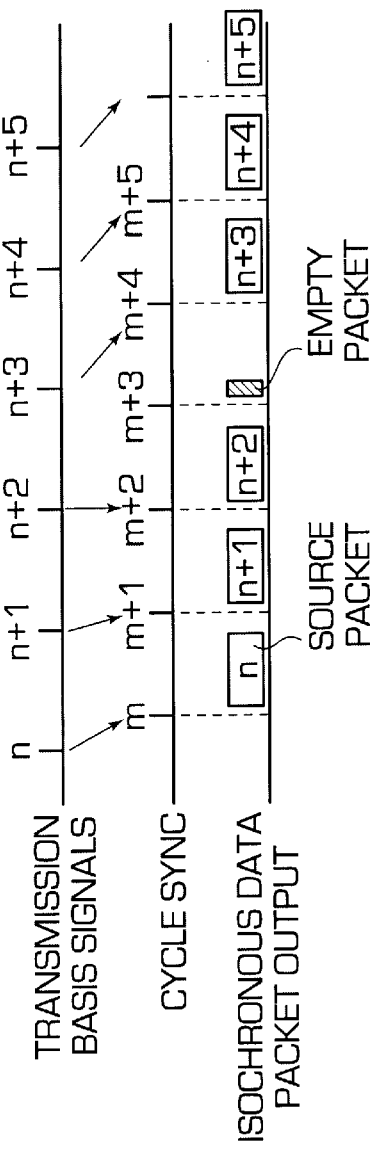
FIG. 7 is a timing chart of operation of the transmission timing controller.

The cycle of the transmission signal is 133.5 µs in 525-60 system (NTSC system) and is 133.3 µs in 625-60 system (PAL system). In both systems, the cycle of the transmission signal is longer than the cycle of the cycle sync for the IEEE 1394, which is 125 µs. Therefore one or two cycle syncs of IEEE 1394 may occur in a transmission basis signal interval. Referring to FIG. 7, at the first cycle sync after the transmission basis signal n following the F__st__d, the source packet n is transmitted. At the first cycle sync after the transmission basis signal n+2, the source packet n+2 is transmitted and at the second cycle sync after the transmission basis signal n+2 (shown as m+3), an empty packet is transmitted. In this manner, the invention can control the data distribution in a fixed margin and provide a uniform data transfer rate defined with respect to SD-VCR DIF. As mentioned above, the device for converting data transfer rate in communication of digital audio and video data can overcome the different data transfer rates of the inner bus of the digital device (camcorder) and IEEE 1394 bus, thereby satisfying the specifications for an SD-format digital interface.

While there have been shown what are presently considered to be preferred embodiments of the invention, it will be apparent to those skilled in rile art that various changes and modifications can be made without departing from the scope of the invention as defined by the appended claims.

What is claimed is:

1. A device for converting a data transfer rate to provide communication of at least one of digital audio and video data between a first digital device and a second digital device, comprising:

a transmitter providing a stream of source packets from the first digital device to the second digital device according to a transmission specification in an isochronous mode; and an alignment device determining insert positions of empty packets to convert transmission timing of an inner bus in the first digital device into a fixed timing according to the transmission specification wherein said alignment device comprises;

a timing simulator receiving data signals and a mode signal and generating transmission basis signals; and a transmission timing controller receiving the transmission basis signals from said timing simulator and transmitting packets at every one of a plurality of cycle syncs of the transmission specification which occurs after a fixed length of time, wherein transmission of said packets is performed according to fixed rules;

wherein the data signals occur after delaying a first signal, corresponding to the beginning of the transmission of first data in a frame of the inner bus in the first digital device, for a delay interval.

2. The device of claim 1, wherein the mode signal indicates whether the data is in NTSC mode.

3. The device of claim 1, wherein the mode signal indicates whether the data is in PAL mode.

4. The device of claim 1, wherein the fixed length of time is 125 µs.

5. The device of claim 1, wherein the fixed rules specify transmission timing of a source packet such that when one of said plurality of cycle syncs occurs in a transmission basis signal interval, a packet with data corresponding to source packet information is transmitted corresponding to the cycle sync and when two cycle syncs occur in a transmission basis signal interval, said packet with data corresponding to the source packet information is transmitted corresponding to only one of the two cycle syncs and an empty packet without data is transmitted corresponding to the other cycle sync.

6. The device of claim 1, wherein the delay interval corresponds to an interval for filling a memory with data to buffer the data, said delay interval also being determined by an operator.

7. The device of claim 5, wherein the transmission basis signal interval when the mode signal corresponds to NTSC mode is a cycle interval of a frame divided into 250 sections.

8. The device of claim 5, wherein the transmission basis signal interval when the signal mode corresponds to a PAL mode is a cycle interval of a frame divided into 300 sections.

9. The device of claim 1, wherein the transmission specification is IEEE 1394.

10. A method for converting a data transfer rate for communication of at least one of digital audio and video data, which transmits a stream of source packets from a first digital device to a second digital device according to a transmission specification in isochronous mode, comprising the steps of:

(1) receiving data signals and a mode signal to generate transmission basis signals for transmitting the stream of the source packets and (2) using the transmission basis signals to transmit packets at every cycle sync of the transmission specification according to fixed rules, wherein the fixed rules specify transmission timing of a source packet for said cycle sync such that when said cycle sync occurs in a transmission basis signal interval, a respective packet corresponding to said cycle sync with data corresponding to source packet information is transmitted at the cycle sync and when two cycle syncs occur in a transmission basis signal interval, a single respective packet corresponding to one of said two cycle syncs with data corresponding to the source packet information is transmitted at said one of the two cycle syncs and an empty packet without data is transmitted at the other cycle sync.

11. The method of claim 10, wherein the data signals occur after delaying a first signal, corresponding to the beginning of the transmission of data in a frame of an inner bus in the first digital device, for a delay interval.

12. The method of claim 10, wherein the mode signal indicates whether the data is in NTSC mode.

13. The method of claim 10, wherein the mode signal indicates whether the data is in PAL mode.

14. The method of claim 10, wherein the sync cycle is 125 µs.

15. The method of claim 11, wherein the delay interval corresponds to an interval for filling a memory with data to buffer the data, said delay interval also being determined by an operator.

16. The method of claim 10, wherein the transmission basis signal interval when the mode signal corresponds to NTSC mode is a cycle interval of a frame divided into 250 sections.

17. The method of claim 10, wherein the transmission basis signal interval when the mode signal corresponds to a PAL mode is a cycle interval of a frame divided into 300.

18. The method of claim 10, wherein the transmission specification is IEEE 1394.

* * * * *